(No Model.)
J. RYAN & W. A. McDONALD.
DRAFT EQUALIZER.
No. 420,360.   Patented Jan. 28, 1890.
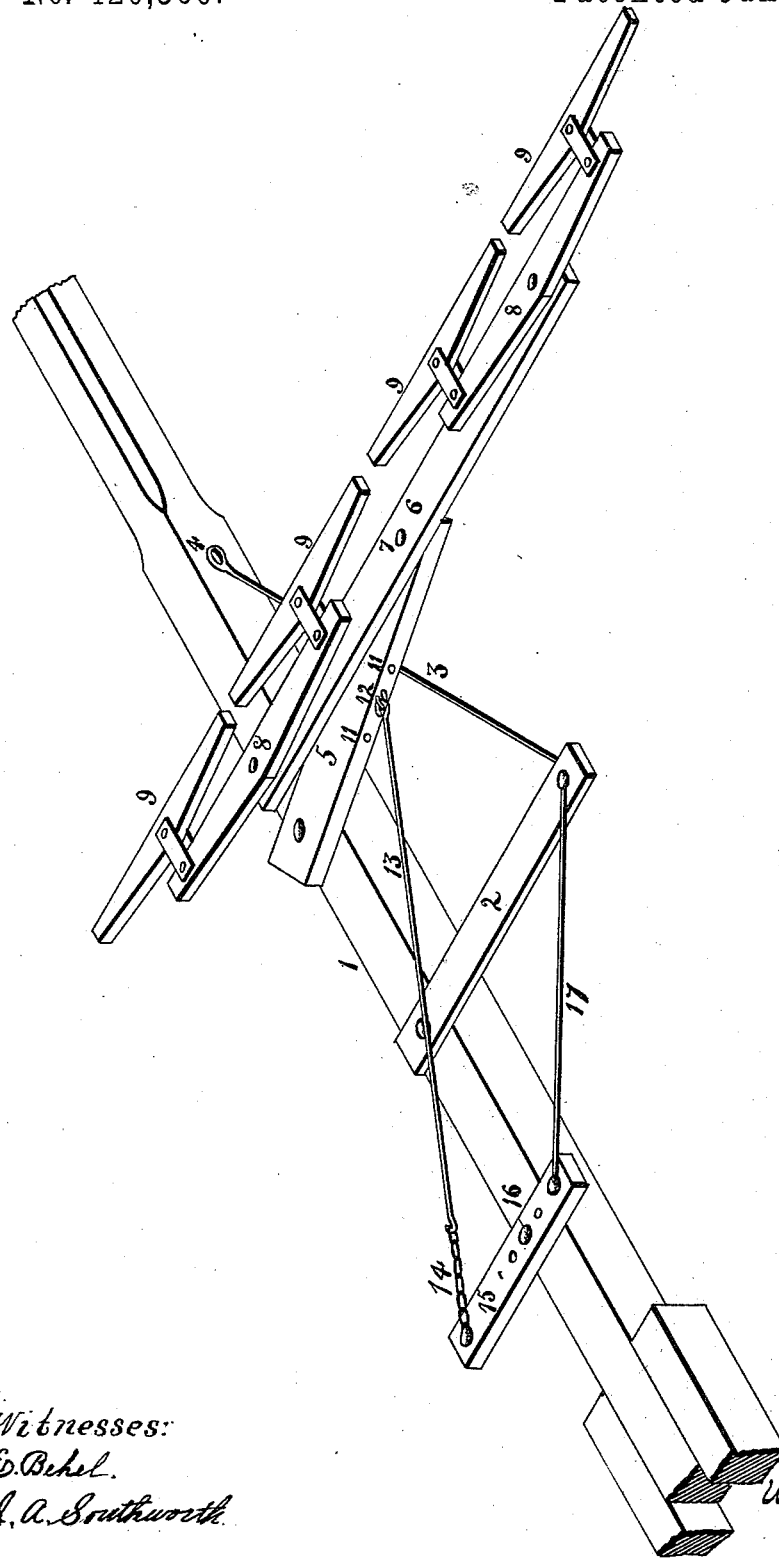
Witnesses:
E. Behel.
J. A. Southworth.
Inventors:
John Ryan
William McDonald
By A. O. Behel
atty.

UNITED STATES PATENT OFFICE.

JOHN RYAN, OF PECATONICA, AND WILLIAM A. McDONALD, OF LEAF RIVER, ILLINOIS.

DRAFT-EQUALIZER.

SPECIFICATION forming part of Letters Patent No. 420,360, dated January 28, 1890.

Application filed October 28, 1889. Serial No. 328,406. (No model.)

*To all whom it may concern:*

Be it known that we, JOHN RYAN, of Pecatonica, Winnebago county, and WILLIAM A. McDONALD, of Leaf River, Ogle county, and State of Illinois, have invented certain new and useful Improvements in Equalizers, of which the following is a specification.

The object of this invention is to construct a four-horse equalizer which will equalize the draft upon each horse, and which will also rid the implement or machine of side draft in connection with which it is employed.

The figure represents in the accompanying drawing an isometrical representation of our improved equalizer.

The tongue 1 of the equalizer may be that of any implement requiring the power of four horses, but more especially that of a grain-binder. A bar 2 extends laterally from the side of the tongue, and is pivoted thereto between the end of the tongue and its connection with the implement to which it is attached. A brace-rod 3 connects the free end of the bar 2 with the tongue in a rigid manner by extending some distance forward of its connection with the bar, where a bolt 4 holds it in place. A swinging bar 5 has a pivotal connection with the tongue forward of the bar 2, and has a four-horse evener 6 pivoted near its free end by a bolt 7, or otherwise. This evener is pivoted about midway of its length to the bar 5, and has a two-horse evener 8 pivoted at its ends. Each of the two-horse eveners has two singletrees 9 connected therewith. This swinging bar 5 has a series of holes 11, and in the center one is secured a hook 12, into which a flexible connection—in this instance consisting of a rod 13 and chain 14—is secured. This chain 14 has one end connected to the grain end of a short evener 15, pivoted to the tongue by a bolt 16. The stubble end of this evener is connected to the end of the laterally-extending bar 2 by a rod or chain 17. This evener is made lengthwise adjustable in its connection with the tongue.

In harvesting-machines requiring the draft of four horses there is considerable side draft, and as only one horse can be used on the cutting-apparatus side of the machine it is necessary to have an equalizer that will rid the machine of side draft and divide the draft equally between the four horses, which we accomplish by the above-described construction, and by the holes 11 the leverage can be changed at will.

We claim as our invention—

1. The combination of a tongue, a bar projecting laterally from the tongue and having a draft-rod connecting it with the tongue, an arm pivoted to the tongue, an evener pivoted to the arm, an evener on the tongue, a rod-connection between the bar and the evener on the tongue, and a flexible connection between this last-named evener and the pivoted arm, substantially as set forth.

2. The combination of a tongue, a bar projecting laterally from the tongue and having a draft-rod connecting it with the tongue, an arm pivoted to the tongue, an evener pivoted to the arm, an evener on the tongue, a rod-connection between the pivoted arm and the evener on the tongue and made adjustable in its connection with the pivoted arm, and a connection between this last-named evener and the laterally-projecting bar, substantially as set forth.

JOHN RYAN.
WILLIAM A. McDONALD.

Witnesses:
A. O. BEHEL,
E. BEHEL.